United States Patent
Friggstad

(10) Patent No.: US 7,540,522 B2
(45) Date of Patent: Jun. 2, 2009

(54) STEERING CONNECTION ASSEMBLY BETWEEN MULTIPLE TOWED IMPLEMENTS

(75) Inventor: Terrance A. Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 455 days.

(21) Appl. No.: 11/290,170

(22) Filed: Nov. 30, 2005

(65) Prior Publication Data

US 2007/0145714 A1   Jun. 28, 2007

(51) Int. Cl.
 *B62D 13/00* (2006.01)
(52) U.S. Cl. .................. 280/444; 280/442; 280/443; 280/445; 280/426
(58) Field of Classification Search ............. 280/444, 280/442, 443, 445, 426
See application file for complete search history.

(56) References Cited

U.S. PATENT DOCUMENTS

| 1,658,203 | A |   | 2/1928  | Karlsson |          |
|-----------|---|---|---------|----------|----------|
| 1,750,514 | A | * | 3/1930  | Gates    | 280/412  |
| 2,210,007 | A |   | 8/1940  | Rodin    |          |
| 2,637,258 | A | * | 5/1953  | Cox et al. | 172/280 |
| 2,823,929 | A |   | 2/1958  | Pasquali |          |
| 2,974,978 | A |   | 3/1961  | Isachsen |          |
| 3,053,551 | A | * | 9/1962  | Kirkpatrick | 280/444 |
| 3,149,858 | A | * | 9/1964  | Gilbert  | 280/442  |
| 3,229,986 | A |   | 1/1966  | Ferris   |          |
| 3,448,999 | A | * | 6/1969  | Kollander et al. | 280/426 |
| 4,171,825 | A | * | 10/1979 | Woodell  | 280/443  |
| 4,295,659 | A |   | 10/1981 | Mergen   |          |
| 4,382,607 | A |   | 5/1983  | Voight   |          |
| 4,484,758 | A | * | 11/1984 | Murray et al. | 280/442 |
| 4,824,135 | A | * | 4/1989  | McGregor | 280/442  |
| 5,382,041 | A | * | 1/1995  | Keith    | 280/476.1 |
| 6,135,484 | A |   | 10/2000 | Lauronen et al. |   |
| 6,796,572 | B1 | * | 9/2004 | McGhie   | 280/426  |
| 2005/0077703 | A1 | * | 4/2005 | Tango    | 280/442  |

FOREIGN PATENT DOCUMENTS

EP   0 350 008 A2   1/1990

OTHER PUBLICATIONS

"Rear Wheel Steering", SeedHawk Brochure, date unknown.
Bill Struatman, "Rear Steer Keeps Seed Hawk in Steep Hills", Western Producer, Apr. 1, 2004, p. 103.

* cited by examiner

*Primary Examiner*—Paul N Dickson
*Assistant Examiner*—Maurice Williams
(74) *Attorney, Agent, or Firm*—Rebecca Henkel

(57) ABSTRACT

A steering connection assembly that interconnects an implement train comprising first and second detachable implements towed by a draw bar of a tow vehicle is provided. The first implement is pivotally attached at the draw bar so as to rotate about a first vertical axis, and the second implement is pivotally attached to the first implement. The steering connection assembly includes a drive linkage pivotally connected at a draw bar so as to rotate about a second vertical axis. A steering linkage interconnects a rearward end of the drive linkage to a wheel assembly in support of the frame of the second towed implement. In response to a turn of the tow vehicle, a hitch coupling member generates a turn signal communicated via the drive linkage so as to cause the steering linkage to steer the wheel assembly of the second implement in a direction opposite a turn direction of the tow vehicle.

12 Claims, 2 Drawing Sheets

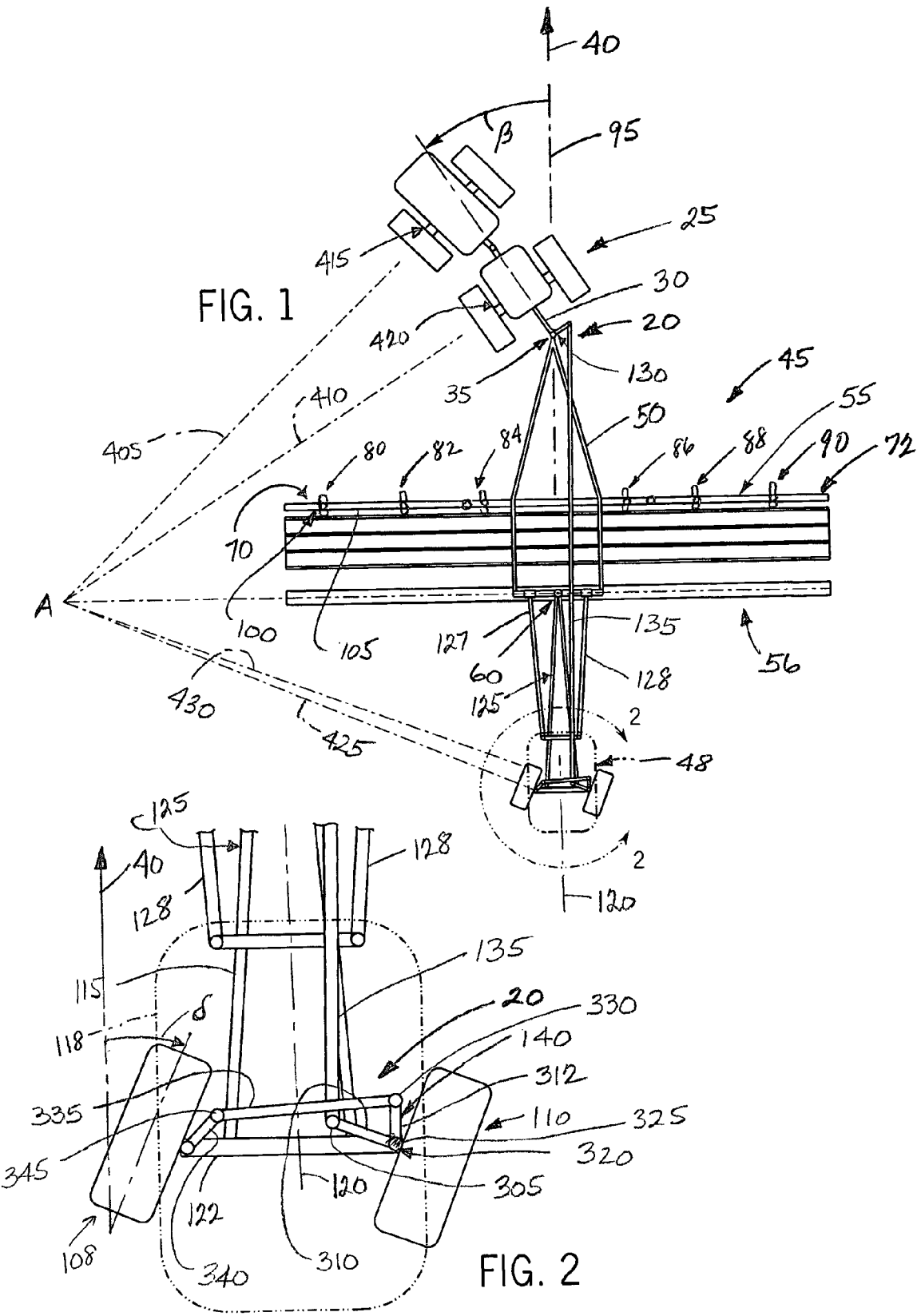

STEERING CONNECTION ASSEMBLY BETWEEN MULTIPLE TOWED IMPLEMENTS

FIELD OF THE INVENTION

The invention relates to a steering connection assembly for a vehicle train including multiple towed implements behind a tow vehicle, and more specifically, relates to a steering connection assembly having a hitch coupling member operable to generate a signal to steer the wheel assemblies of a rearward detachable towed agricultural implement towed behind a forward detachable towed agricultural implement in response to a turn by the tow vehicle from a forward direction of travel.

BACKGROUND OF THE INVENTION

An implement train employing a series of trailers or implements towed behind a prime mover or tow vehicle is often used to even out or distribute heavy loads. In particular to agriculture, a tow vehicle, e.g., tractor, is known to be used to pull a seed cart towed behind a conventional drill or planting implement for distributing fertilizer and/or seed in a field. The seed cart is typically towed as a separate implement relative to the distribution implement because the excessive weight of the seed and/or fertilizer can adversely affect the planting depth. The seed cart is often towed behind the distribution implement to avoid obscuring the field of vision of the operator in the tow vehicle. Rather than towing the distribution implement at the end of the vehicular train, the distribution implement is preferably pulled directly at the tow vehicle to enhance distribution of the product when turning a corner in the field. In a typical arrangement, the drill implement is pivotally connected to be steered about a first articulation point at the tow vehicle, and the seed cart is pivotally connected to be steered about a second articulation point relative to the drill implement.

However, the above-described agricultural implement train has several drawbacks. With the desire for increased distribution spread, the conventional distribution implement includes emerging type wing sections or booms that each can reach a length of 70 to 80-feet. When ready for transport, the conventional distribution implements retract the wing sections in a fold-back back manner, creating a long-trailing wing section. These long-trailing wing sections dictate a longer tow bar for the towed-behined seed cart to provide clearance of the folded wing sections when the implement train maneuvers a corner during transport. In regard to field operation, operators desire the seed cart to be as close as possible to the distribution implement so as to enhance delivery of product from the seed cart to the distribution implement, and yet also desire a steering connection system that provides the seed cart with sufficient clearance of the extended wing sections of the distribution implement.

Therefore, there is a need or desire for an enhanced steering connection assembly for an implement train that addresses the drawbacks described above. The steering connection assembly should also be configured to be utilized with a wide variety of implements or trailers towed behind a tow vehicle, in addition to those related to agriculture.

SUMMARY OF THE INVENTION

The present invention provides a connection assembly for and a method of steering a multiple implement train arrangement being towed by a tow vehicle that meets the desires and needs described above. The steering connection assembly of the present invention thus enhances the smooth maneuverability of the towed multiple implement train arrangement, and thereby enhances the planting operation in the field as well as the transport of the multiple implement train arrangement.

In a first embodiment of the present invention, a steering connection assembly interconnecting a vehicle train arrangement is provided. The vehicle train arrangement comprises a tow vehicle steering a turn angle from a forward direction of travel, a first detachable implement having a tow bar pivotally interconnected to rotate about a first vertical axis at a draw bar of the tow vehicle, and a second detachable implement towed rearward of the first detachable implement. The second detachable implement includes at least one wheel assembly in moveable support of a frame in support of a product tank, and a second tow bar pivotally connected to rotate about a second vertical axis relative to the frame of the first implement. A rearward end of the second tow bar is fixedly attached at the frame of the second detachable implement. The steering connection assembly includes a hitch coupling member fixedly attached at so as to move with the draw bar. The steering connection assembly further includes a drive linkage pivotally connected at, so as to rotate about a third vertical axis with respect to, the hitch coupling member where the third vertical axis is spaced from the first vertical axis. In response to the turn angle of the tow vehicle from the forward direction of travel, the hitch coupling member moves the drive linkage so as to cause the steering linkage to move the wheel assembly of the second detachable implement in a turn direction opposite the turn angle of the tow vehicle from the forward direction of travel. The steering connection assembly also attaches the second implement in a manner that restrains a central longitudinal axis of the second implement from not being generally inline with a central longitudinal axis of the first implement.

The preferred first detachable implement is a drill implement and the second detachable implement is a seed cart configured to provide a supply of seed for distribution by the drill implement to the field. The preferred tow bar of the seed cart includes an A-frame configured structure fixed relative to the frame of the seed cart. The preferred steering connection assembly includes at least one strut configured to restrain the central longitudinal axis of the drill implement from not being inline with the central longitudinal axis of the seed cart.

One embodiment of the hitch coupling member is keyed to define a first leg and second to receive the draw bar of the tow vehicle therebetween. Another embodiment of the hitch coupling member includes a generally vertical aligned plate member perpendicular to a generally horizontal aligned plate member. The vertical aligned member is engaged against the draw bar of the tow vehicle. The horizontal member includes an opening therethrough configured to receive the first pin pivotally coupling the drive linkage to the hitch coupling member, the first pin defining the first vertical axis about which the drive linkage pivots relative to the hitch coupling member.

The preferred steering connection assembly further comprises a steering arm fixedly attached at least one of the wheel assemblies so as to move with rotation of the wheel assembly, and a steering rod member pivotally interconnecting the steering arm to the steering linkage. The preferred steering linkage is generally L-shaped and includes a first leg and a second leg and an opening located where the legs meet. The opening receives the third pin. A free end of the first leg is pivotally connected to the drive linkage and a free end of the second leg is pivotally connected to the steering rod member.

In another embodiment, the present invention provides a towed implement train arrangement being towed by a draw bar of a tow vehicle in a forward direction of travel over a surface. The arrangement comprises a first detachable implement having a tow bar pivotally connected at the draw bar of the tow vehicle so as pivot about a first vertical axis. The arrangement further includes a second detachable implement having a tow bar pivotally connected at the first detachable implement so as to rotate about a second vertical axis. The second detachable implement includes a wheel assembly in moveable support of a frame of the second detachable implement and not in support of the first detachable implement from the surface. The arrangement further includes a steering connection assembly interconnecting the wheel assembly of the second detachable towed implement to the draw bar of the tow vehicle. The steering connection assembly includes a drive linkage having a forward end pivotally connected at the draw bar of the tow vehicle so as to rotate about a second vertical axis spaced apart from the first vertical axis. The steering connection assembly also includes a steering linkage interconnecting the rearward end of the drive linkage member to the wheel assembly of the second detachable implement. The hitch coupling member generates a turn signal representative of turn angle of the tow vehicle from the forward direction of travel, and the drive linkage moves so as to communicate the turn signal to the steering linkage. In response to the turn signal, the steering linkage moves the wheel assembly of the second detachable implement in a direction opposite of the turn angle of the tow vehicle from the forward direction of travel.

The present invention also provides a method of steering a multiple implement train arrangement towed behind a tow vehicle having a draw bar in a forward direction of travel. The multiple implement train arrangement includes a first detachable implement having a tow bar pivotally attached at the draw bar so as to rotate about a first vertical axis. The train arrangement further includes a second detachable towed implement having a tow bar pivotally attached at first implement to rotate about a second vertical axis. The method comprises turning the tow vehicle and draw bar a turn angle from a forward direction of travel; generating a turn signal with a hitch coupling member fixed at the draw bar, the turn signal representative of the turn angle of the tow vehicle; communicating the turn signal via a drive linkage to a wheel assembly in moveable support of the frame of the second detachable implement; and steering the wheel assembly at the second detachable implement in response to the turn signal from the drive linkage so as to cause the wheel assembly to rotate in a direction opposite a direction of the turn angle of the tow vehicle from the forward direction of travel while maintaining a central longitudinal axis of the second implement inline with a central longitudinal axis of the first implement.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 illustrates a top plan view of a towed implement having a draw bar in tow of an implement train arrangement having a steering connection assembly in accordance with the present invention.

FIG. 2 shows a detailed top plan view of the steering connection assembly shown in FIG. 1.

DETAILED DESCRIPTION OF THE PREFERRED EMBODIMENTS

Figure 5:
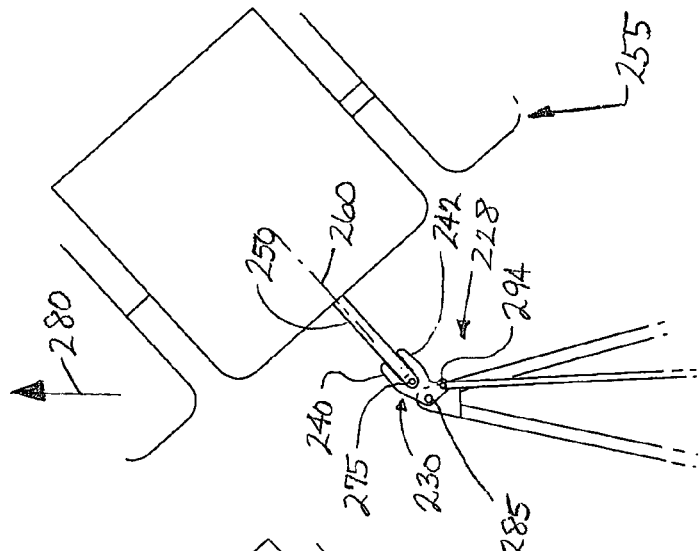
FIG. 5 shows a detailed top plan view of still yet another embodiment of a hitch coupling member of a steering connection assembly in accordance with the present invention.

Referring to FIG. 1, a steering connection assembly 20 is illustrated for interconnecting a multiple implement train arrangement to a tow vehicle 25 turning a turn angle ($\beta$) from a forward direction of travel 40. The tow vehicle 25 generally includes a draw bar 30 configured to be pivotally interconnected to the multiple implement train about a vertical axis defined by a hitch or coupling pin 35. The multiple implement train includes a first detachable implement in tow of a second detachable implement. A preferred first detachable implement is an agricultural drill or planting implement 45 operable to distribute a supply of product (e.g., seed, fertilizer, pesticide, herbicide, etc.) in a field. The preferred towed second detachable implement is a seed cart or seed cart 48 operable to provide the supply of product to the drill implement 45. Yet, other types of detachable towed implements (e.g., a storage trailer, etc.) can be connected via the steering connection assembly 20 and is not limiting on the invention.

Still referring to FIG. 1, the drill implement 45 is typically pulled directly by the draw bar 30 of the tow vehicle 25. The preferred drill implement 45 includes a tow bar 50 that includes an A-frame structure that is fixedly attached at a structural frame 55 of the drill implement 45, and one or more presser wheels 56 mounted thereon in known manner for the distribution of agricultural product in the field. The forward end of the tow bar 50 is pivotally interconnected about the vertical axis defined by the coupling pin 35 of the draw bar 30 of the tow vehicle 25. The drill implement 45 includes wing sections 70 and 72 pivotally supported on the frame 55 in a known manner to move between an extended, operative position for operation in the field and a folded, inoperative position (not shown) for transport. In the extended, operative position, the wing sections 70 and 72 each typically extend approximately 70-80 feet. In the folded, inoperative position, the wing sections 70 and 72 are folded back in a rearward direction and positioned generally parallel with a central longitudinal axis 95 of the drill implement 45. The implement 45 includes a rearward hitch or coupling pin 60 configured to pivotally interconnect the drill implement 45 and the rearward towed seed cart 48. This is a common configuration of a drive train arrangement comprising a tow vehicle 25 in tow of the drill implement 45 in tow of the seed cart 48 that provides an operator at the tow vehicle 25 with good visibility and the enhanced control over the drill implement 45 and the seed cart 48 when working around obstructions or going into a tight corner.

A series of wheel assemblies 80, 82, 84, 86, 88 and 90 are mounted in moveable support of the frame 55 and wing sections 70 and 72 of the drill implement 45. One embodiment of one or more the wheel assemblies 80, 82, 84, 86, 88, and 90 is a caster-type wheel assembly configured to caster or pivot about a vertical axis defined by a generally vertically aligned steering column or kingpin 100, respectively, in a known manner. The steering column 100 generally extends downward from a common forward support 105 of the frame 55 generally perpendicular to the central longitudinal axis 95 of the drill implement 45 such that the wheel assemblies 80, 82, 84, 86, 88 and 90 are commonly aligned. Of course, the drill implement 45 may include additional non-aligned wheel assemblies (not shown).

As illustrated in FIGS. 1 and 2, the seed cart 48 generally includes at least a pair of wheel assemblies 108 and 110 in support of a frame 115 and a bulk tank 118 that define a central longitudinal axis 120. The wheel assemblies 108 and 110 are floatation-type, over-sized wheel assemblies. One embodiment of the wheel assemblies 108 and 110 are supported on a common wheel axle or shaft 122 and configured to turn in tandem in a direction of travel. Alternatively, each wheel assembly 108 and 110 can be a caster-type wheel assembly configured to caster or pivot about a steering column in a manner similar to the steering column 100 of the one or more wheel assemblies 82, 84, 86, 88 and 90.

The frame 115 of the seed cart 48 includes a tow bar 125. The tow bar 117 includes an A-frame shaped structure similar to the tow bar 50 of the drill implement 45 described above. The tow bar 117 is pivotally connected by the hitch or coupling pin 60 of the drill implement 45 so as to rotate about a vertical axis defined by the coupling pin 60.

Referring to FIG. 1, the steering connection assembly 20 in accordance with the present invention generally interconnects the wheel assemblies 108 and 110 of the seed cart 48 to the draw bar 30 of the tow vehicle 25 in a manner such that, in response to a turn angle (β) of the tow vehicle 25 from the forward direction of travel 40 about the first vertical axis defined by the coupling pin 35 at the end of the draw bar 30 of the tow vehicle 25, the steering connection assembly 20 communicates a turn signal to cause the wheel assemblies 108 and 110 of the seed cart 48 to steer or turn in an opposite direction relative to the direction of the turn angle (β) of the tow vehicle 25 relative to the forward direction of travel 40. The preferred steering connection assembly 20 generally includes a first and a second support strut members 127 and 128, respectively, and a hitch coupling member 130 interconnected by a drive linkage 135 and a steering linkage 140 to the wheel assemblies 108 and 110 of the seed cart 48.

The first and second strut member 127 and 128, respectively, are located on opposite sides of the central longitudinal axis 120 of the seed cart 48 relative to one another. The first and second lateral strut members 127 and 28 each interconnects the frame 55 of the drill implement 45 and the frame 115 of the seed cart 48 such that the drill implement 45 is fixedly interconnected to turn or move with the seed cart 48. In other words, the strut members 127 and 128 restrain the central longitudinal axis 95 of the drill implement 45 from not being inline with the central longitudinal axis 120 of the seed cart 48 as the tow vehicle 25 turns the turn angle (β) from a forward direction of travel 40.

Figure 3:
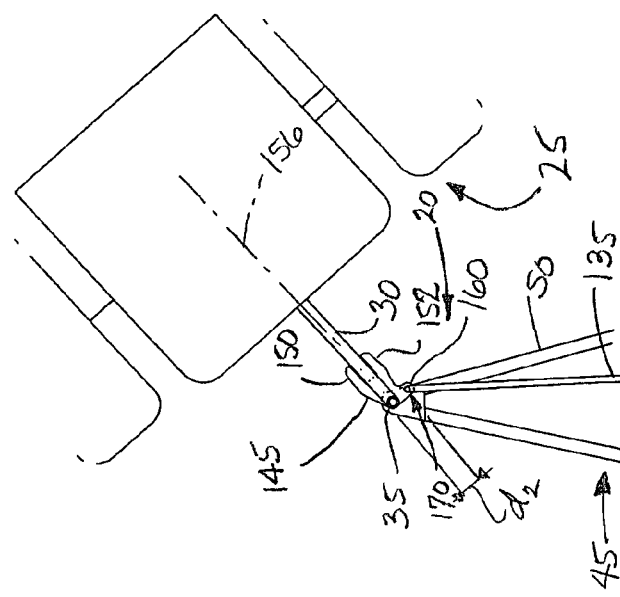
FIG. 3 shows a detailed top plan view of one embodiment of a hitch coupling member of the steering connection assembly in accordance with the present invention.

Referring now to FIG. 3, one embodiment of the hitch coupling member 130 is fixedly interconnected at the coupling pin 35 at the draw bar 30 of the tow vehicle 25. The hitch coupling member 130 includes a generally horizontally aligned plate member 145 fixedly attached to move with the draw bar 30. A forward end (relative to the forward direction of travel 40) of the plate member 145 includes a generally U-shaped key having a first leg 150 and a second leg 152 to receive at least a portion of the draw bar 30 of the tow vehicle 25 therebetween. An opposite rearward end of the hitch coupling member 130 includes a first opening configured to receive a hitch or coupling pin 35 therethrough that defines a vertical axis about which the draw bar 30 and the hitch coupling member 130 are pivotally interconnected at the tow bar 50 of the drill implement 45. The opening is located generally aligned with the central longitudinal axis 95 of the drill implement 45. The rearward end of the hitch coupling member 130 further includes a second opening laterally offset or spaced from the first opening relative to a longitudinal axis 156 of the draw bar 30. The second opening is configured to receive a second coupling pin 160 that defines a vertical axis about which the drive linkage 135 is pivotally interconnected at the hitch coupling member 130. The second opening is shown located through an extended portion 170 of the hitch coupling member 130 that extends laterally outward from the lateral most outward edge of the leg 152 of the hitch coupling member 130 relative to the longitudinal axis 156 of the draw bar 30. Of course, the extended portion 170 and pivotally connected drive linkage 135 can alternatively be located on the opposite side of the hitch coupling member 130 and is not limiting on the invention.

Figure 4:
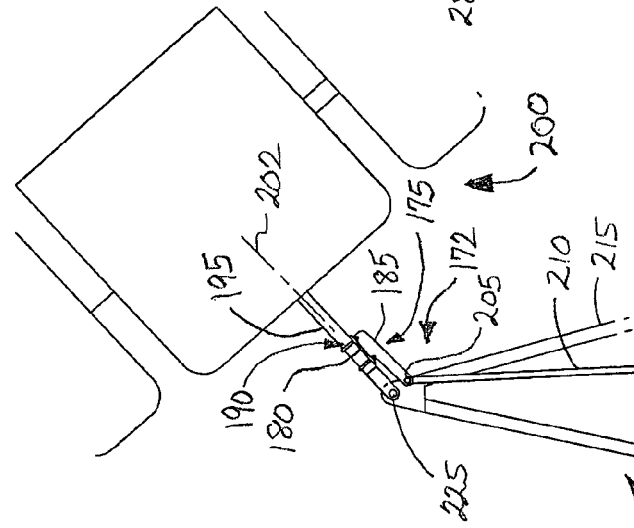
FIG. 4 shows a detailed top plan view of yet another embodiment of a hitch coupling member of a steering connection assembly in accordance with the present invention.

FIG. 4 shows another embodiment of a steering connection assembly 172 having a hitch coupling member 175. The hitch coupling member 175 includes a generally vertically aligned plate member 180 having a common edge with a horizontally aligned plate member 185. The hitch coupling member 175 is connected by a pair of U-shaped bolts 190 configured to receive a draw bar 195 therethrough so as to fixedly interconnect the vertically aligned plate member 180 against a lateral side of the draw bar 195 of a tow vehicle 200 relative to a central longitudinal axis 202 of the draw bar 195. The horizontal plate member 185 includes an opening to receive a coupling pin 205 therethrough that defines a vertical axis about which the hitch coupling member 175 rotates with respect to a drive linkage 210. The drive linkage 210 is pivotally connected so as to be located above a tow bar 215 of the drill implement 220, (similar to the tow bar 50 of the drill implement 45). A coupling pin 225 pivotally interconnects the draw bar 195 of the tow vehicle 200 at the tow bar 215 of the drill implement 220, without passing through the hitch coupling member 175.

FIG. 5 shows yet another embodiment of a steering connection assembly 228 having a hitch coupling member 230. The hitch coupling member 230 includes a U-shaped key defined by a pair of legs 240 and 242 configured to receive a draw bar 250 of a tow vehicle 255 therebetween, similar to the hitch coupling member 130 described above. The hitch coupling member 230 further includes an opening located between the first and second legs 240, 242 generally along a longitudinal centerline 260 of the draw bar 250 of the tow vehicle 255. This opening is configured to receive a coupling pin 275 that fixedly interconnects the hitch coupling member 230 at the draw bar 265 such that the hitch coupling member 230 moves and rotates with the draw bar 250 of the tow vehicle 255. The hitch coupling member 230 further includes a second opening located rearward from the first opening (relative to forward direction of travel 280) and generally along the longitudinal centerline 260 of the draw bar 250. The second opening is configured to receive a coupling pin 285 therethrough pivotally interconnecting the hitch coupling member 230 to a tow bar 290 of a drill implement 292 about a vertical axis defined by the coupling pin 285. The hitch coupling member 230 includes a third opening configured to receive a coupling pin 294 that defines a vertical axis about which the hitch coupling member 230 is pivotally interconnected at a steering linkage 296 (similar to the steering linkage 140).

Referring back to FIGS. 2 and 3, the drive linkage 135 is generally a linear, elongated member extending from the hitch coupling member 130 to the steering linkage 140 located at the wheel assemblies 108 and 110 of the seed cart 48. As shown in FIG. 3, the forward end of the drive linkage 135 is pivotally interconnected to rotate relative to the hitch coupling member 130 about the vertical axis defined by coupling pin 160. As shown in FIG. 2, the opposite, rearward end of the drive linkage 135 is interconnected by a coupling pin 305 at the steering linkage 140.

The steering linkage 140 is pivotally mounted at the seed cart 48. The preferred steering linkage 140 is generally L-shaped or V-shaped member having a first leg 310 integral with a second leg 312. The free end of the first leg 310 includes an opening to receive the coupling pin 305 pivotally interconnecting the steering linkage 140 at the drive linkage 135 about a vertical axis defined by the coupling pin 305. An elbow or vertice 320 where the first leg 310 meets the second leg 312 includes an opening configured to receive a coupling pin 325 therethrough that defines a vertical axis about which the steering linkage 140 is pivotally interconnected at the frame 115. The free end of the second leg 312 includes an opening to receive a coupling pin 330 therethrough pivotally interconnecting the steering linkage 140 to rotate about a vertical axis, defined by the coupling pin 330, with respect to a steering rod member 335 interconnecting the wheel assemblies 108 and 110. The steering linkage 140 is also connected so that rotation of the steering linkage 140 about the coupling pin 325 causes a respective turn of the one of the wheel assemblies 108 and 110 in the same direction relative to the forward direction of travel 40.

The steering rod member 335 is laterally interconnected (relative to the central longitudinal axis 120) such that lateral movement of the steering rod member 335 causes the other of the wheel assemblies 108 and 110 to turn in tandem with the steering linkage 140 from the forward direction of travel 40. The first end of the steering rod member 335 includes an opening to receive a coupling pin 345 therethrough that defines a vertical axis about which the steering rod member 335 is pivotally interconnected at a steering arm 340 of the wheel assembly 108. The steering arm 340 is rigidly connected at the wheel assembly 108 so that turning of the steering arm 340 causes respective rotation or turning of the wheel assembly 108. The second opposite end of the steering rod member 335 includes an opening configured to receive the coupling pin 330 therethrough that defines the vertical axis about which the steering rod member 335 is pivotally interconnected at the steering linkage 140. Alternatively, the opposite end of the steering rod member 335 is pivotally interconnected to another steering arm (not shown) rigidly interconnected to cause respective rotation or turning of the wheel assembly 110, similar to the steering arm 340.

Having described the general structure of the steering connection assembly 20 of the present invention, the following is a general description of the operation of the steering connection assembly 20 between the tow vehicle 25 and the drill implement 45.

FIG. 1 illustrates a top view of the drive train comprising the tow vehicle 25 in tow of the drill implement 45 and the seed cart 48 interconnected by the steering connection assembly 20 of the present invention. The tow vehicle 25 is shown cornering or turning about a reference point A. Reference lines 405 and 410 each illustrate a radius concentric relative to forward and rearward wheel axes 415 and 420, respectively, of the tow vehicle 25 extending through a reference point A. In a similar manner, reference lines 425 and 430 illustrate a radius concentric relative to the axles of the wheel assemblies 108 and 110, respectively, extending through the reference point A. The radius of cornering of the draw bar 30 about point A is set by the degree of steering or turn angle ($\beta$) of the tow vehicle 25 from the forward direction of travel 40. As the draw bar 30 rotates from the forward direction of travel 40 with the tow vehicle 25, the tow bar 50 and fixedly attached frame 55 of the drill implement 45 pivots about the vertical axis defined by the hitch coupling pin 35. The hitch coupling member 130 is fixedly connected so as to rotate with the draw bar 30 of the tow vehicle 25. Rotation of the hitch coupling member 130 moves the drive linkage 135 in a generally longitudinal direction relative to the central longitudinal axis 95 of the drill implement 45. The movement of the drive linkage 135 causes the steering linkage member 140 to rotate about the vertical axis defined by the coupling pin 325 with respect to the frame 115 of the seed cart 48. The hitch coupling member 130 thereby communicates a turn signal via the drive linkage 135 to the steering linkage member 140. In response to the turn signal, the steering linkage member 140 causes the steering rod member 335 to laterally move in the general left and right turn direction of the tow vehicle 25 relative to the forward direction of travel 40. This lateral movement of the steering rod member 335 causes the wheel assemblies 108 and 110, respectively, to rotate or turn in a direction ($\delta$) opposite the direction of the turn angle ($\beta$) of the tow vehicle 25 relative to the forward direction of travel 40. This rotation of the wheel assemblies 108 and 110 complies to smoothly corner the drill implement 45 and the seed cart 48 about the reference point A.

The desired response rate of the wheel assemblies 108 and 110 in turning the drill implement 45 and the seed cart 48 can be tailored to a greater or lesser amount by modifying the relative length of the drive linkage 135 and a distance ($d_2$) between the vertical axes defined by the coupling pins 35 and 160. In addition to enhancing the response rate for steering the drill implement 45 and the seed cart 48, the steering connection assembly 20 also causes less or reduced side loading forces at the wheel assemblies 82, 84, 86, 88 and 90 of the drill implement 45 and at the wheel assemblies 108 and 110 of the seed cart 48. Also, the steering connection assembly 20 enhances the ability of the drill implement 45 and the seed cart 48 to more closely follow the tow vehicle 25 and thereby be less prone to cut across corners, ditches, and gate posts.

A wide variety of implements could employ the steering connection assemblies 20, 172 and 228 constructed in accordance with the invention. Thus, while the invention is disclosed with reference to a drill implement 45 in tow a seed cart 48 behind the tow vehicle 25, the invention is not so limited. One skilled in the art will recognize that the steering connection assemblies 20, 172 and 228 of the present invention can be employed to interconnect various types of towed implements or trailers connected to various types of tow vehicles and is not limiting on the invention.

Many changes and modifications could be made to the invention without departing from the spirit thereof. The scope of these changes will become apparent from the appended claims.

I claim:

1. A steering connection assembly interconnecting a vehicle train arrangement comprising a tow vehicle steering a turn angle from a forward direction of travel, a first detachable implement having a tow bar pivotally interconnected to rotate about a first vertical axis at a draw bar of the tow vehicle, and a second detachable implement towed rearward of the first detachable implement, the second detachable implement including at least one wheel assembly in moveable support of a frame and a second tow bar having a forward end pivotally connected at so as to rotate about a second vertical axis relative to the frame of the first implement, the second tow bar also including a rearward end fixedly attached at the frame of the second detachable implement, the steering connection assembly comprising:
   a hitch coupling member fixedly attached at so as to move with the draw bar; and
   a drive linkage pivotally connected at, so as to rotate about a third vertical axis with respect to, the hitch coupling member,
wherein the third vertical axis spaced from the first vertical axis, wherein in response to the turn angle of the tow vehicle, the hitch coupling member moves the drive linkage so as to cause a steering linkage to move the wheel assembly of the second detachable implement in a turn direction opposite the turn angle of the tow vehicle from the forward direction of travel, and wherein the steering connection assembly attaches the second implement in a manner that restrains a central longitudinal axis of the second implement from not being generally inline with a central longitudinal axis of the first implement, wherein the hitch coupling member is keyed to define a first leg and second leg to receive the draw bar of the tow vehicle therebetween.

2. The steering connection assembly of claim 1, wherein the steering connection assembly includes at least one strut member removably attached between the frame of the first implement and the frame of the second implement, wherein the at one strut restrains the central longitudinal axis of the first detachable implement from being not inline with the central longitudinal axis of the second detachable implement.

3. The steering connection assembly of claim 2, wherein the at least one strut member includes a first strut member and a second strut member located on opposite side of the central longitudinal axis of the second detachable implement, the first and second struts each attached at the frame of the first implement and at the frame of the second implement.

4. The steering connection assembly of claim 1, wherein the hitch coupling member includes an opening to receive a first coupling pin defining the first vertical axis about which the tow bar of the first implement is pivotally connected at the draw bar of the tow vehicle, wherein the drive linkage is pivotally connected by a second coupling pin extending through a second opening in the hitch coupling member, the second coupling pin defining the third vertical axis, and further comprising a steering linkage pivotally interconnected at, so as to rotate about a fourth vertical axis with respect to, the frame of the second detachable implement, wherein the steering linkage is pivotally interconnected by a third coupling pin at the frame of the second detachable implement, the third coupling pin defining the fourth vertical axis.

5. The steering connection assembly of claim 4, further comprising:
   a steering arm fixedly attached at the wheel assembly of the second implement so as to move with rotation of the wheel assembly, wherein rotation of the steering linkage causes rotation of the steering arm and attached wheel assembly.

6. The steering connection assembly of claim 5, further comprising:
   a steering rod member pivotally interconnecting the steering arm to the steering linkage.

7. The steering connection assembly of claim 6, wherein the steering linkage is generally L-shaped and includes a first leg and a second leg and a opening located where the legs meet, and wherein the opening receives third coupling pin, and wherein a free end of the first leg is pivotally connected at a most rearward end of the drive linkage and a free end of the second leg is pivotally connected at the steering rod member.

8. A towed implement train arrangement being towed by a draw bar of a tow vehicle in a forward direction of travel over a surface, comprising:
   a first detachable implement having a tow bar pivotally connected at the draw bar of the tow vehicle so as pivot about a first vertical axis;
   a second detachable implement in tow rearward of the first detachable implement, the second detachable implement including a wheel assembly in moveable support of a frame of the second detachable implement and not in support of the first detachable implement from the surface;
   a steering connection assembly interconnecting the wheel assembly of the second detachable towed implement to the draw bar of the tow vehicle, wherein in response to a turn angle of the tow vehicle from the forward direction of travel, the steering connection assembly rotates the wheel assembly of the second detachable implement in a direction opposite of a direction of the turn angle of the tow vehicle from the forward direction of travel,
   a hitch coupling member fixedly attached at the draw bar to rotate with the draw bar with the turn angle of the tow vehicle from a forward direction of travel;
   a drive linkage having a forward end pivotally connected at the hitch coupling member so as to rotate relative to the hitch coupling member about a second vertical axis spaced apart from the first vertical axis;
   a steering linkage interconnecting the rearward end of the drive linkage to the wheel assembly of the second detachable implement, and
   a steering arm pivotally interconnected to the steering linkage and fixedly attached at the wheel assembly of the second implement so as to move with rotation of the wheel assembly, wherein rotation of the steering linkage causes rotation of the steering arm and attached wheel assembly,
   wherein in response to the turn angle of the tow vehicle, the hitch coupling member moves the drive linkage in a general fore and aft direction so as to cause the steering linkage to move the wheel assembly of the second detachable implement in the direction opposite of a direction of the turn angle of the tow vehicle from the forward direction of travel,
   wherein the steering linkage member is pivotally connected at the frame of the second detachable implement so as to rotate about a third vertical axis.

9. The towed implement train arrangement of claim 8, wherein the steering connection assembly includes at least one strut member attached between the frame of the first detachable implement and the frame of the second detachable implement, wherein the at least one strut restrains a central longitudinal axis of the first detachable implement from being not inline with a central longitudinal axis of the second detachable implement.

10. The towed implement train arrangement of claim 8, wherein the hitch coupling member includes a key configuration defining a first leg and second leg configured to receive the draw bar therebetween.

11. The towed implement train arrangement of claim 8, further comprising:
    a steering rod member pivotally interconnecting the steering arm to the steering linkage.

12. The towed implement train arrangement of claim 11, wherein the steering linkage is generally L-shaped and includes a first leg and a second leg and a opening located where the legs meet, wherein the opening receives a pin that defines the third vertical axis, and wherein a free end of the first leg is pivotally connected to the drive linkage and a free end of the second leg is pivotally connected to the steering rod member.

\* \* \* \* \*